(12) United States Patent
Rice et al.

(10) Patent No.: US 6,283,705 B1
(45) Date of Patent: Sep. 4, 2001

(54) VARIABLE VANE WITH WINGLET

(75) Inventors: Edward Claude Rice, Indianapolis; Robert Anthony Ress, Jr., Carmel; Jeffrey Lister Hansen, Indianapolis, all of IN (US)

(73) Assignee: Allison Advanced Development Company, Indianapolis, IN (US)

( * ) Notice: Subject to any disclaimer, the term of this patent is extended or adjusted under 35 U.S.C. 154(b) by 0 days.

(21) Appl. No.: 09/258,994

(22) Filed: Feb. 26, 1999

(51) Int. Cl.$^7$ ....................................... F01D 17/12
(52) U.S. Cl. ........................... 415/160; 415/162; 415/914
(58) Field of Search .................................. 415/159, 160, 415/161, 162, 150, 914

(56) References Cited

U.S. PATENT DOCUMENTS

| | | | |
|---|---|---|---|
| 3,736,070 | 5/1973 | Moskowitz et al. | 415/160 |
| 4,214,852 | 7/1980 | Tuley et al. | 415/159 |
| 4,231,703 | 11/1980 | Weiler | 415/160 |
| 4,278,398 | 7/1981 | Hull | 415/160 |
| 4,420,288 * | 12/1983 | Bischoff | 415/914 |
| 4,741,665 | 5/1988 | Hanser | 415/159 |
| 4,768,922 | 9/1988 | Kozak et al. | 415/160 |
| 4,867,635 | 9/1989 | Tubbs | 415/162 |
| 4,978,280 | 12/1990 | Tubbs | 415/162 |
| 5,215,434 | 6/1993 | Greune et al. | 415/159 |
| 5,380,152 * | 1/1995 | Sikorski et al. | 415/160 |
| 5,466,122 * | 11/1995 | Charbonnel et al. | 415/160 |
| 5,492,446 | 2/1996 | Hawkins et al. | 415/160 |

* cited by examiner

Primary Examiner—Edward K. Look
Assistant Examiner—Richard Woo
(74) Attorney, Agent, or Firm—Woodard, Emhardt, Naughton, Moriarty & McNett

(57) ABSTRACT

A gas turbine engine variable vane having a winglet integrally formed therewith. In one embodiment, the variable vane includes a winglet attached to one end so as to reduce endwall losses resulting from air leakage from the high-pressure side to the low-pressure side of the airfoil. The winglet substantially increases the width of the endwall gap thereby reducing the loss associated with the vortex flow caused by leakage of gas from the pressure side to the section side of the airfoil. In another aspect the winglet runs along the airfoil thereby increasing stiffness and acting as a bracing strut to increase the resonant frequency of the airfoil.

35 Claims, 11 Drawing Sheets

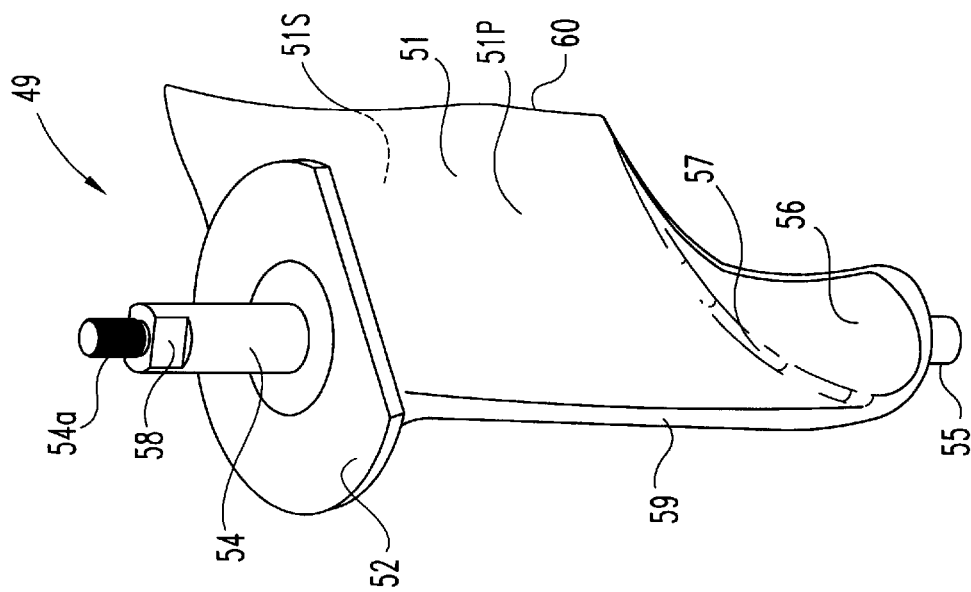
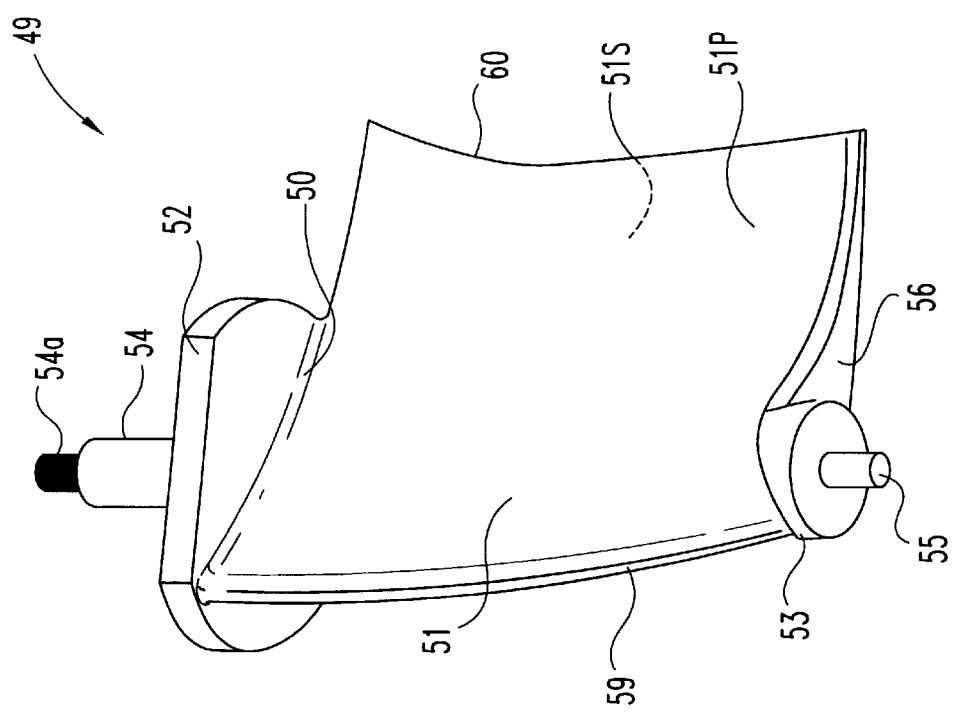

VARIABLE VANE WITH WINGLET

This invention was made with U.S. Government support under contract number S33615-91-C-2119, and the U.S. Government may have certain rights in the invention.

BACKGROUND OF THE INVENTION

The present invention relates generally to the aerodynamic performance of a gas turbine engine variable vane. More particularly, in one embodiment of the present invention a winglet is attached to one end of a variable vane so as to reduce end wall losses resulting from air leakage from the high pressure to the low-pressure side of the airfoil. Although, the present invention was developed for use in a gas turbine engine, certain applications may be outside of this field.

It is well known in the gas turbine engine field that the performance of the engine over its cycle may be improved by utilizing variable position airfoils within various portions of the engine. By way of example, some engines utilize variable vanes in the compressor section of the engine in order to provide improved performance at off-design operating conditions. The variable vanes rotate between a relatively closed position under low power conditions and a fully open position under full power conditions. The clearance between the vanes and the walls of the flow passageway allows leakage from the high-pressure side to the low-pressure sides of the vane which has an adverse effect upon engine performance. Larger clearances cause greater losses in performance.

Vanes are often classified according to their aspect ratio which defines a relationship between the vane's radial span and its chordal span. A conventional high aspect ratio variable vane comprises an airfoil, a boss/button, a spindle, and a rotational axis. The boss/button provides a structural transition from the airfoil to the spindle, and covers the inner diameter end and outer diameter end of the airfoil. The coverage of the ends is desirable since it minimizes endwall losses due to leakage flow at the endwall gap between the vanes and the walls of the flow passageway.

As compression system technology level increases, the airfoil aspect ratio typically decreases. A variable vane having a reduced aspect ratio results in reduced coverage by the boss/button at the airfoil inner diameter end and airfoil outer diameter end. The reduction in coverage is a result of geometric limits on button diameter causing a higher percentage of the airfoil chord to have an endwall gap. Further, the reduced coverage by the button/boss of the airfoil often causes a decreased dynamic performance due to a decrease in airfoil stiffness. Therefore, as the airfoil aspect ratio decreases there is often a performance penalty, both aerodynamic and structurally.

Heretofore, there has been a need for a winglet for improving the aerodynamic performance of a gas turbine engine variable vane by reducing endwall losses resulting from fluid losses from the high pressure to the low-pressure side of the airfoil. The present invention satisfies this need in a novel and unobvious way.

SUMMARY OF THE INVENTION

One form of the present invention contemplates a gas turbine engine variable vane, comprising an airfoil having an outer surface extending spanwise between an inner end and an outer end and further extending streamwise between a leading edge and a trailing edge; a first button coupled to one of the ends of the airfoil; and a first winglet positioned along one of the ends of the airfoil and extending from the outer surface.

Another form of the present invention contemplates a gas turbine engine variable vane, comprising an airfoil with a pressure side and a suction side, the airfoil including opposed inner and outer ends and opposed upstream and downstream ends, and a rotational axis extending between the opposed inner and outer ends; a first boss mounted to the inner end; and a first winglet formed with the first boss and mounted to the inner end of the airfoil, wherein the winglet is configured so as to reduce loss associated with a vortex flow caused by the leakage of a gas from the pressure side to the suction side of the airfoil by reducing the size of the vortex and forcing it away from the outer surface.

Yet another form of the present invention contemplates a gas turbine engine including a mechanical housing; a plurality of vanes disposed within a fluid flow path within the mechanical housing, each of the plurality of vanes comprising an airfoil with a pressure side and a suction side, the airfoil having an outer surface extending spanwise between an inner end and an outer end and further extending streamwise between a leading edge and a trailing edge, the airfoil having a rotational axis extending spanwise between the inner and outer ends; a boss coupled to the outer end of the airfoil; and a winglet running along one of the ends of the airfoil and extending from the outer surface, wherein the winglet does not extend past the leading edge of the airfoil.

One object of the present invention is to provide an improved variable vane with a winglet.

Related objects and advantages of the present invention will be apparent from the following description. dr

DESCRIPTION OF THE DRAWINGS

FIG. 7 is a perspective view of one embodiment of the present invention of a variable vane with a winglet on the pressure side of the airfoil.

FIG. 8A is a different side perspective view of the variable vane with a winglet of FIG. 7.

DESCRIPTION OF THE PREFERRED EMBODIMENT

Figure 1:
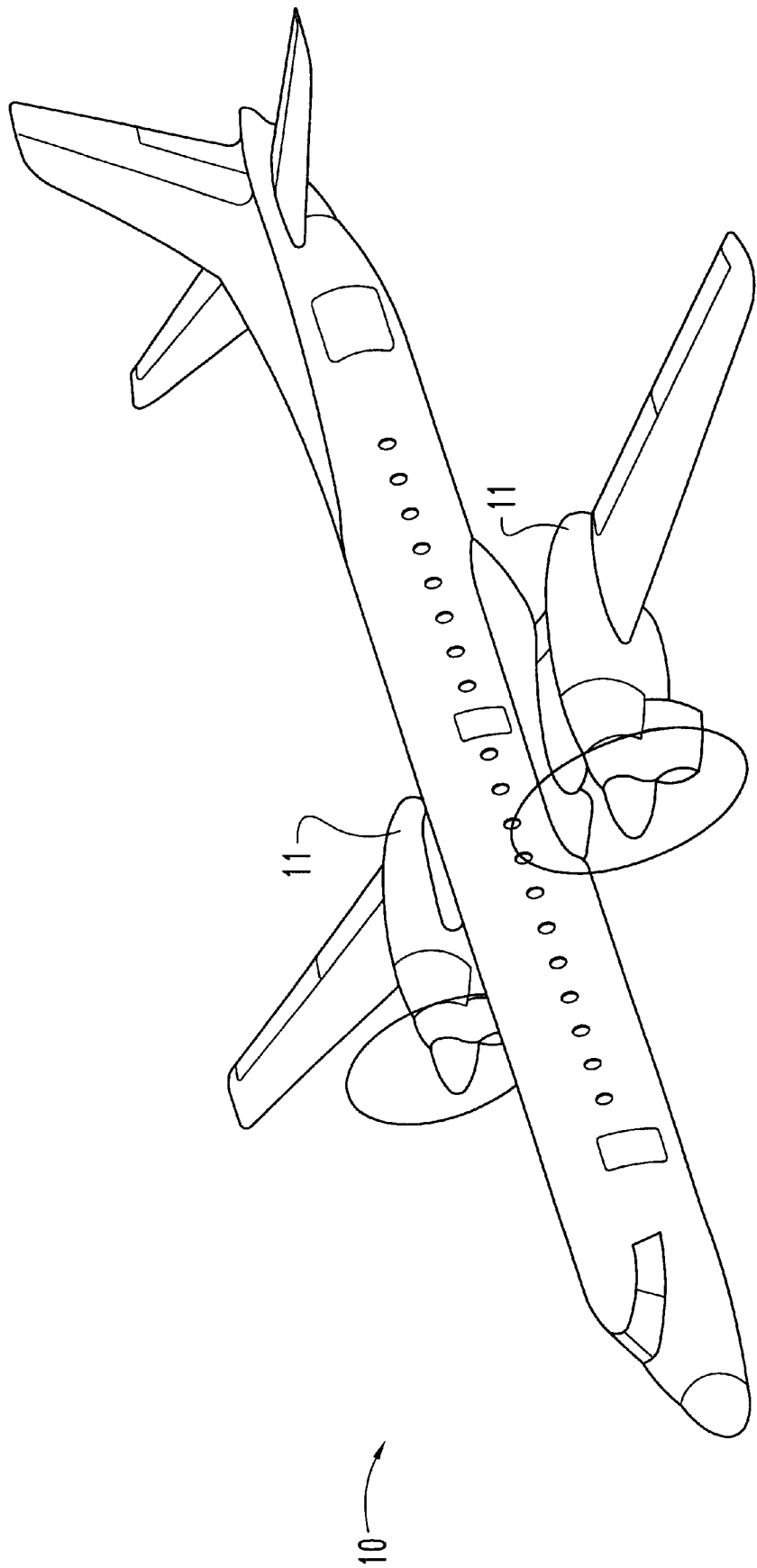
FIG. 1 illustrates an aircraft with a flight propulsion engine.

For the purposes of promoting an understanding of the principles of the invention, references will now be made to the embodiment illustrated in the drawings and specific language will be used to describe the same. It will nevertheless be understood that no limitation of the scope of the invention is thereby intended, any alterations and further modifications in the illustrated device, and any further applications of the principles of the invention as illustrated therein being contemplated as would normally occur to one skilled in the art to which the invention relates.

Figure 2:
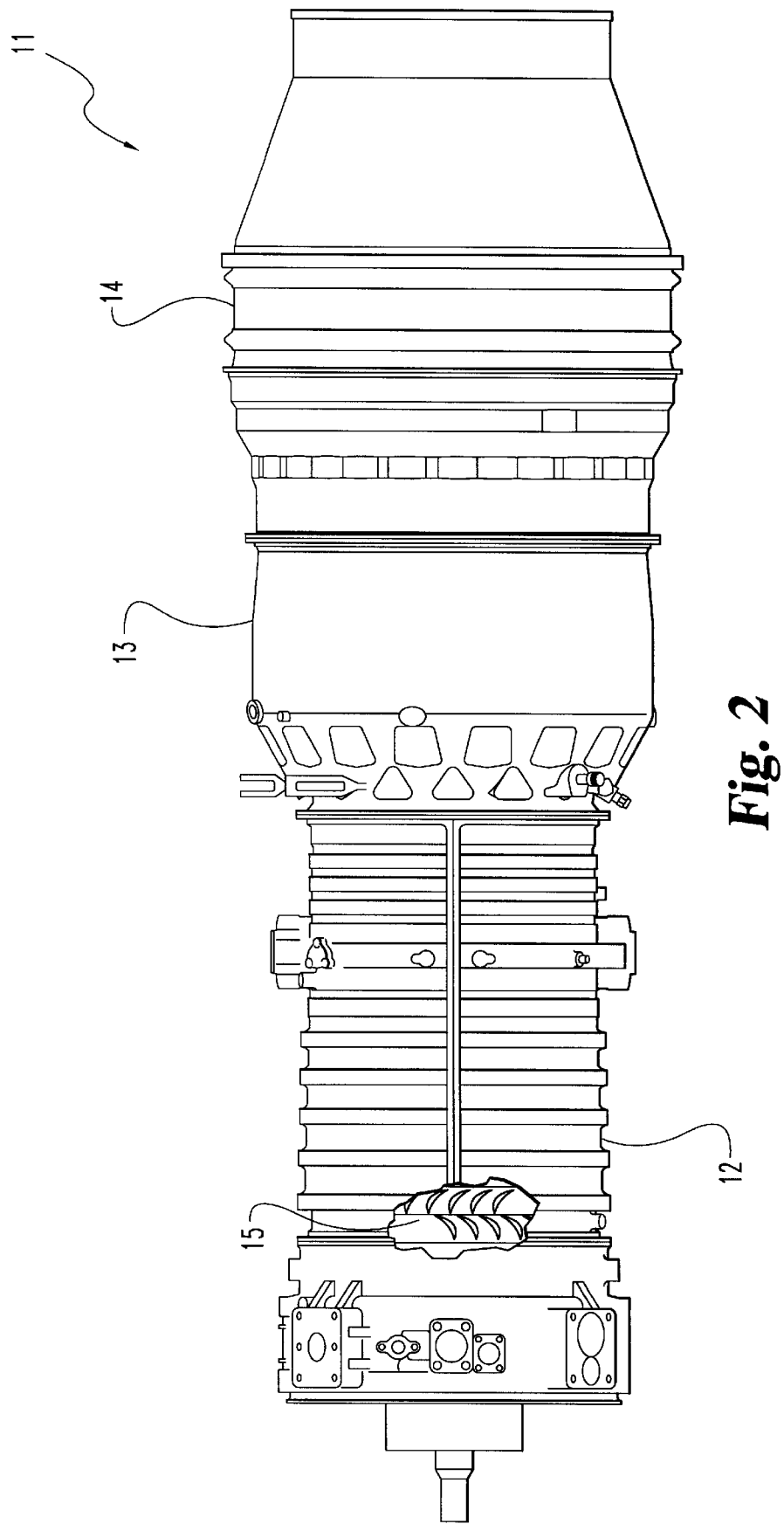
FIG. 2 illustrates the flight propulsion engine when it is a gas turbine engine.

With reference to FIGS. 1 and 2, there is illustrated an aircraft flight propulsion engine 11 coupled to an aircraft 10. It is understood that an aircraft is generic and includes helicopters, tactical fighters, trainers, missiles, and other related apparatuses. In the preferred embodiment, the flight propulsion engine 11 defines a gas turbine engine integrating a compressor 12, a combustor 13, and a power turbine 14. Further, gas turbine engines are known to also include a fan and are referred to as turbo-fan engines. Flight propulsion engine 11 includes variable vanes 15, which are shown at the inlet of compressor 12 and used to optimize the direction at which gases flowing through engine 11 impinge upon rotatable airfoils. However, a variable vane is equally applicable for use between stages within one of the components.

It is important to realize that there are a multitude of ways in which the components can be linked together. Additional compressors and turbines could be added with intercoolers connecting between the compressors and reheat combustion chambers could be added between the turbines. Additionally, gas turbine engines are also increasingly used in ground vehicles. Further, gas turbine engines are equally suited to be used for industrial application. Historically, there has been widespread application of industrial gas turbine engines, such as pumping sets for gas and oil transmission lines, electricity generation, and naval propulsion.

Figure 3:
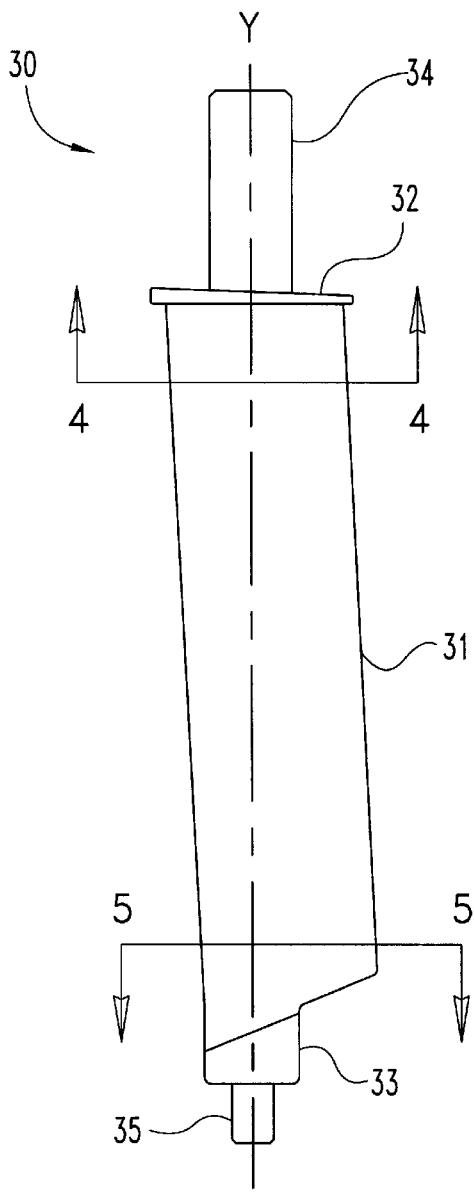
FIG. 3 illustrates a conventional prior art high aspect ratio variable vane.
Figure 4:
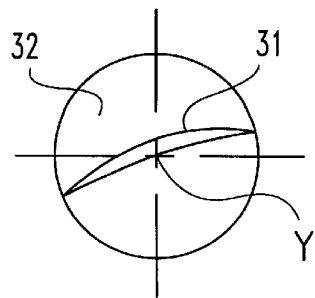
FIG. 4 illustrates a cross section taken along line 4—4 of the high aspect ratio variable vane of FIG. 3.
Figure 5:
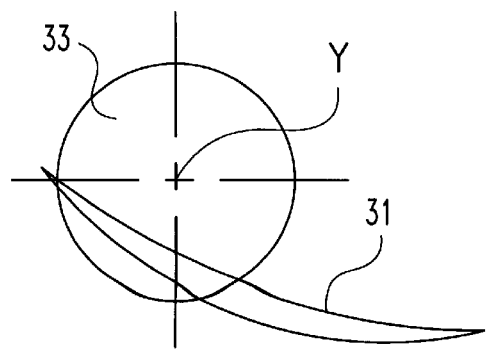
FIG. 5 illustrates a cross section taken along line 5—5 of the high aspect ratio variable vane of FIG. 3.
Figure 6:
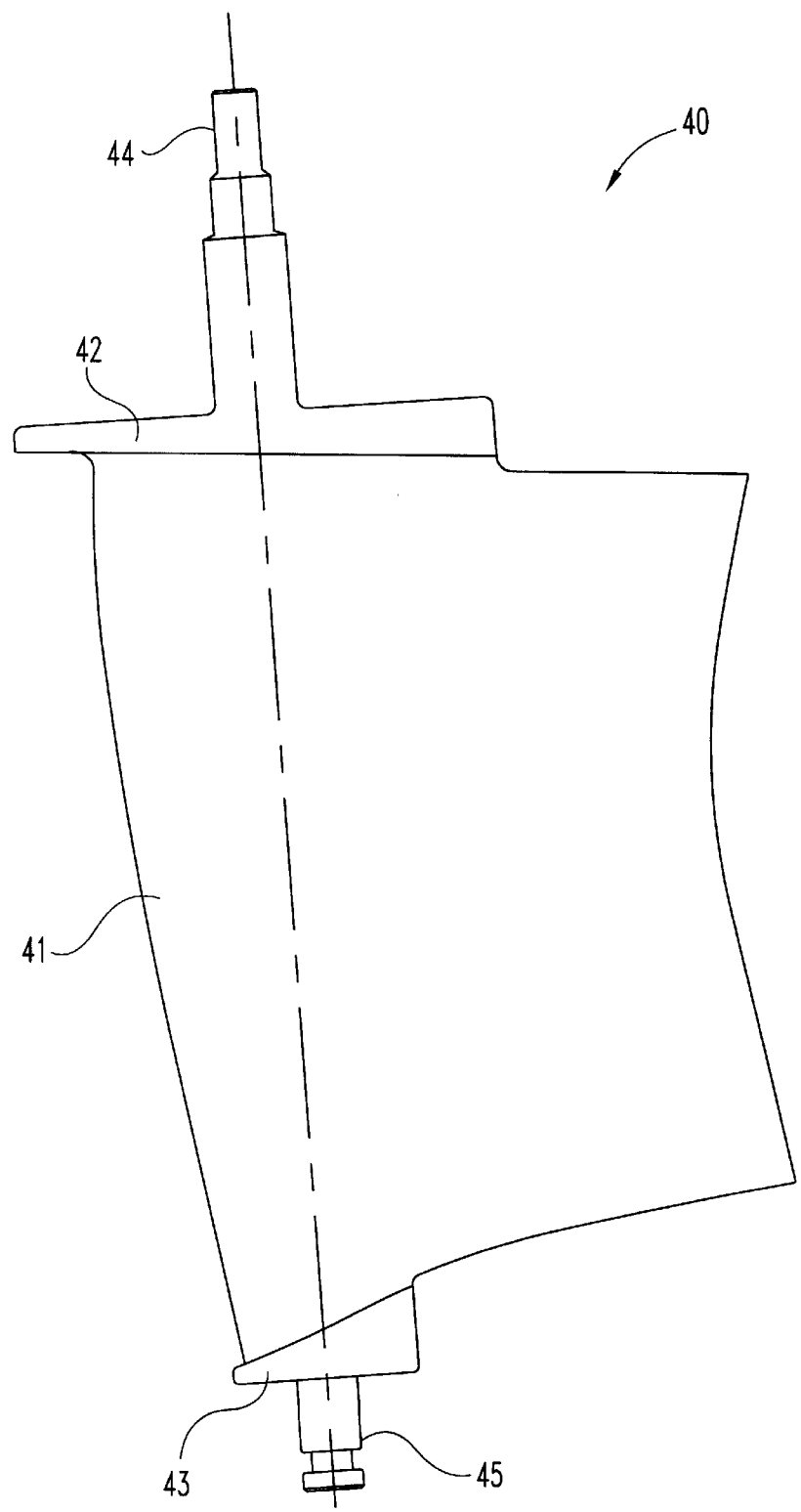
FIG. 6 illustrates a prior art low aspect ratio variable vane.

With reference to FIGS. 3–5, there is illustrated one embodiment of a conventional prior art high aspect ratio variable vane 30. The aspect ratio of a variable vane is defined as the ratio of the radial span divided by the chordal span. High aspect ratio as used herein will denote a ratio greater than about 2.0. The vane 30 comprises an airfoil 31, outer diameter boss or button 32 (hereinafter referred to as button), an inner diameter button 33, outer spindle 34 and inner spindle 35. FIGS. 4 and 5 illustrate cross-sections of the two ends of the prior art high aspect ratio variable vane 30 of FIG. 3. Additionally, with reference to FIG. 6, there is illustrated a conventional prior art low aspect ratio variable vane 40 comprising an airfoil 41, outer diameter button 42, inner diameter button 43, outer spindle 44 and inner spindle 45.

With reference to FIGS. 7 and 8A, there is illustrated one embodiment of the present invention comprising variable vane 49 with winglet 56. The vane 49 comprises an airfoil 51 with leading edge 59, trailing edge 60, inner diameter button 53, outer diameter button 52, inner spindle 55, and outer spindle 54 with a threaded extension 54a extending radially outward from outer diameter spindle 54. Airfoil 51 has a pressure side 51P and a suction side 51S. As is well known from an application of Bemeulli's equation to the airfoil 51, gases flowing over the airfoil have to travel further on one side (the suction side 51S) than the other side (the pressure side 51P) of the airfoil 51. Thus the pressure side 51P has a higher static pressure than the suction side 51S. When vane 49 is illustrated in place within a section of an engine (see FIG. 9), it is shown as having winglet 56 on the radially inner end. In an alternative embodiment, winglet 56 may be attached to the outer diameter end of airfoil 51. In an embodiment, the winglet 56 runs the length of the inner diameter end of the airfoil 51 on the pressure side 51P and blends in to the button 53. Winglet 56 has a thickness as thin as structurally possible so as to minimize aerodynamic blockage. In a preferred embodiment, the winglet 56 thickness 'T' is in the range of about 0.030 to about 0.060 inches. A fillet 57 is incorporated at the intersection of the airfoil 51 to winglet 56 and a second fillet 50 is incorporated at the intersection of the airfoil 51 to button 52 to improve structural performance. It is understood that each fillet may or may not be included as desired. The fillets 50 and 57 reduce stress concentrations that may arise at sharp corners or abrupt transitions from one surface to another.

The vane with winglet combination may be made of alloys, ceramics, and composites. The airfoil, winglet, buttons, spindles and fillet may be made out of different materials. In the preferred embodiment, the vane is an integrally machined forging. However, in alternate embodiments various portions of the vane may comprise an integral casting and the remaining positions are affixed by welding, brazing or other fastening mechanisms generally known to those of ordinary skill in the art. It is contemplated as within the scope of the invention that the vane 49 may have a winglet on either the inner end, the outer end or both ends. In the embodiment where vane 49 has winglets on both ends, the winglets may be generally parallel to one another or they may extend in different directions depending on the configuration of the flow path in the part of the engine where the vane is located. In one embodiment of the variable vane with winglet, the winglet does not extend upstream of the leading edge of the airfoil or the button, whichever of the two is further upstream. Further, the winglet may be on the suction side 51S of the airfoil 51, or the pressure side 51P of the airfoil 51, or on both sides 51P and 51S of the airfoil.

Figure 8C:
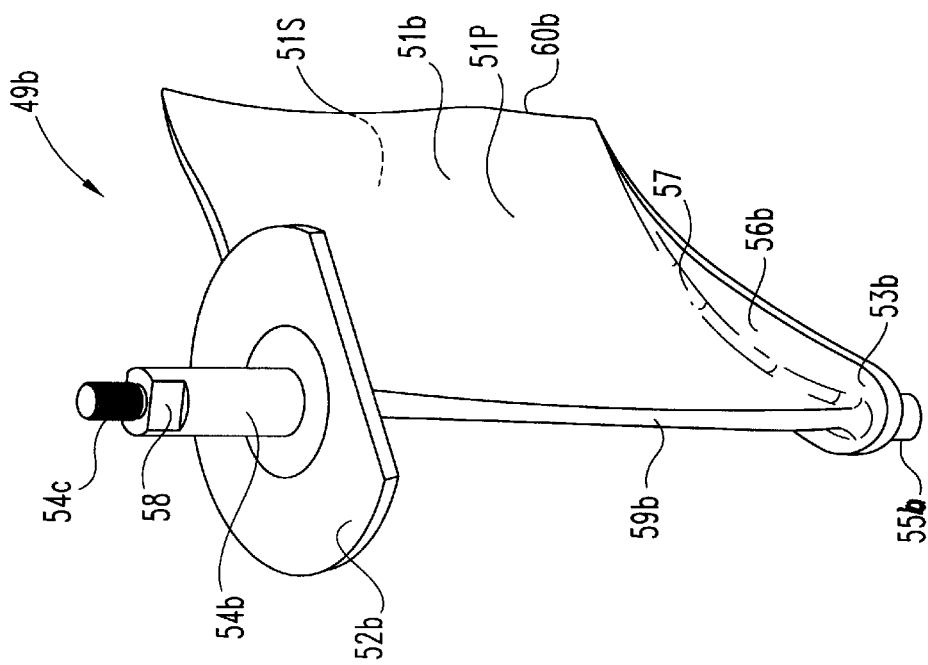
FIG. 8C is a perspective view of another embodiment of the present invention of a variable vane with a winglet on the suction side and the pressure side of the airfoil.
Figure 8B:
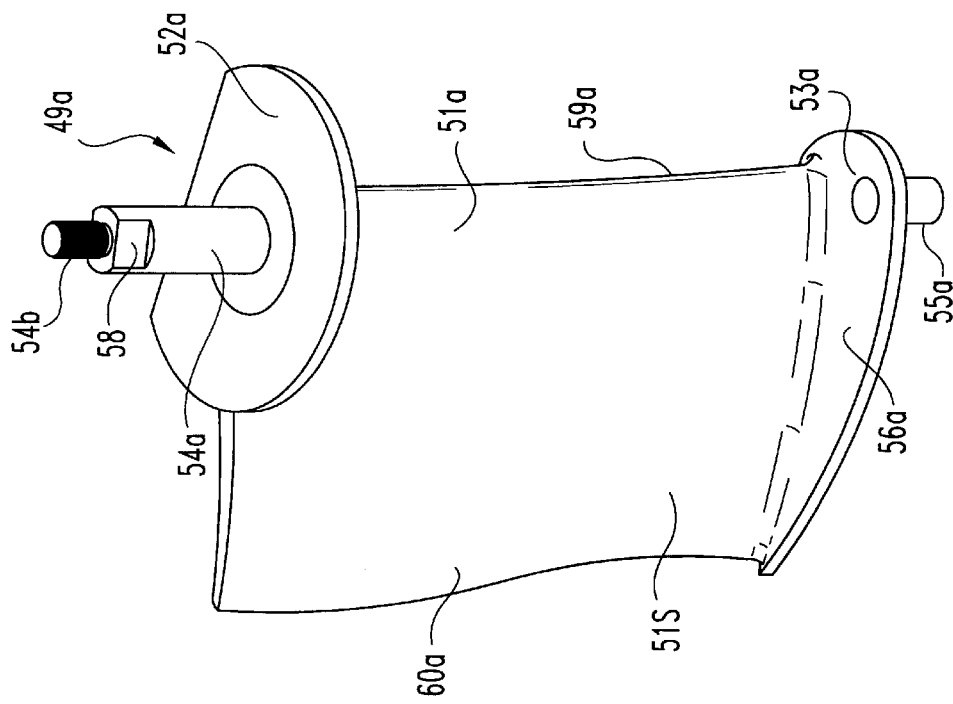
FIG. 8B is a perspective view of an alternate embodiment of the present invention of a variable vane with a winglet on the suction side of the airfoil.

With reference to FIGS. 8B and 8C, there is illustrated two alternate embodiments of variable vanes 49a and 49b that are substantially similar to the variable vane 49. The variable vanes 49a and 49b are substantially similar to variable vane 49 with the primary distinction being the location of the winglet on the vanes. More specifically, variable vane 49a comprises an airfoil 51a with leading edge 59a, trailing edge 60a, inner diameter button 53a, outer diameter button 52a, inner spindle 55a, and outer spindle 54a with a threaded extension 54b extending radially outward from outer diameter spindle 54a. When vane 49a is placed within the gas turbine engine the winglet 56a is on the radially inner end. In an alternative embodiment, the winglet 56a may be attached to the outer diameter end of airfoil 51a. In an embodiment, the winglet 56a runs the length of the inner diameter end of the airfoil 51a on the suction side 51S and blends into the button 53a.

With reference to FIG. 8C, there is illustrated the variable vane 49b, which comprises an airfoil 51b with the leading edge 59b, trailing edge 60b, inner diameter button 53b, outer diameter button 52b, inner spindle 55b, and outer spindle 54b with a threaded extension 54c extending radially outward from outer diameter spindle 54b. When vane 49b is placed within the gas turbine engine, the winglet 56b is on the radially inner end. In an alternative embodiment, the winglet 56b may be attached to the outer diameter end of airfoil 51b. In a preferred embodiment, the winglet 56b runs the length of the inner diameter end of the airfoil 51b on both the pressure side 51P and the suction side 51S and blends into the button 53b.

Figure 9:
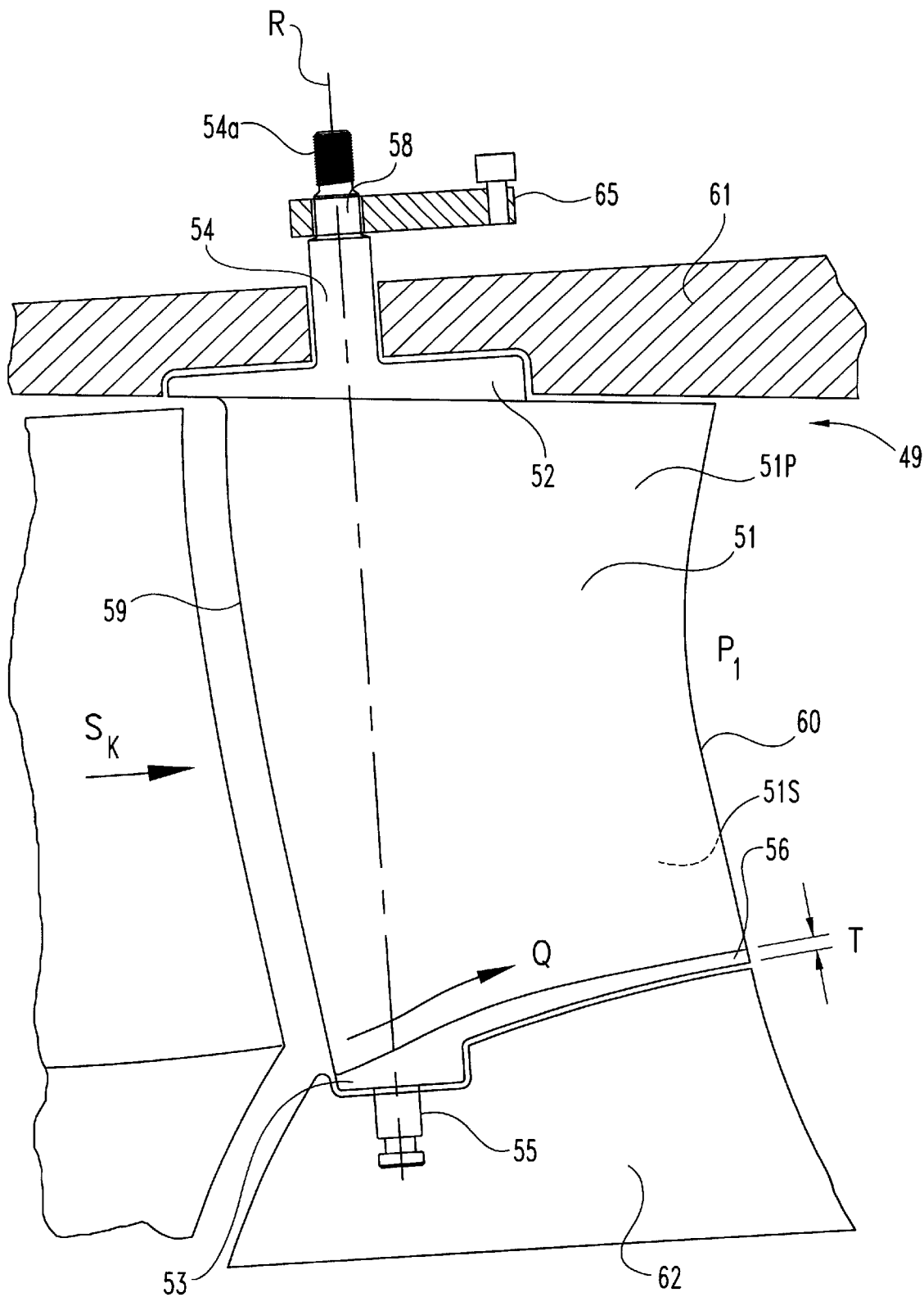
FIG. 9 is a side view of the variable vane with a winglet of FIGS. 7 and 8A shown in place within an engine.
Figure 10:
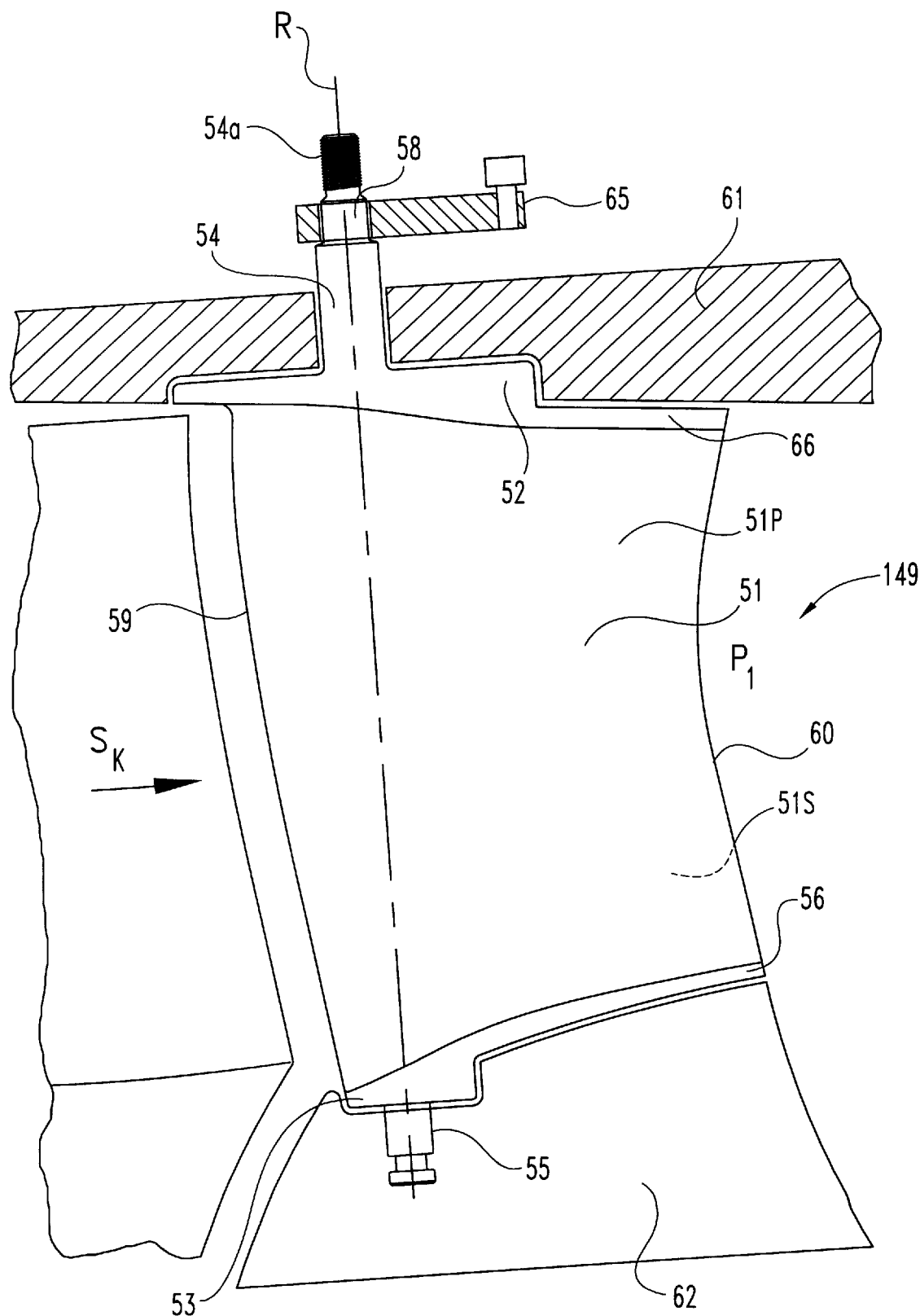
FIG. 10 is a side view of another embodiment of the present invention, a variable vane with two winglets, shown in place within an engine.

With reference to FIG. 9, there is illustrated variable vane 49 disposed within a gas turbine engine and having a fluid flow direction normally in the direction of arrow $S_K$. In one embodiment the fluid flow path over the button as indicated by arrow Q is smooth. More preferably, the variable vane 49 is in the compressor section of the engine. Inner diameter spindle 55 is attached to an inner end wall or shroud 62. Outer diameter spindle 54 is mounted into a gas turbine engine casing or mechanical housing 61. It is understood that outer diameter spindle 54 may be mounted to an intermediate structure which is attached to mechanical housing 61 such as ducts in a high bypass engine. An actuator 65 is attached to the spindle 54 at portion 58 as shown in FIG. 8. Actuator 65 is attached to each of the plurality of variable vanes in the gas turbine engine allowing them all to be moved in registry. With reference to FIG 10, there is illustrated a vane 149 which is substantially similar to vane 49. However, the vane 149 further includes a second winglet 66 at the outer end of airfoil 51.

Figure 11:
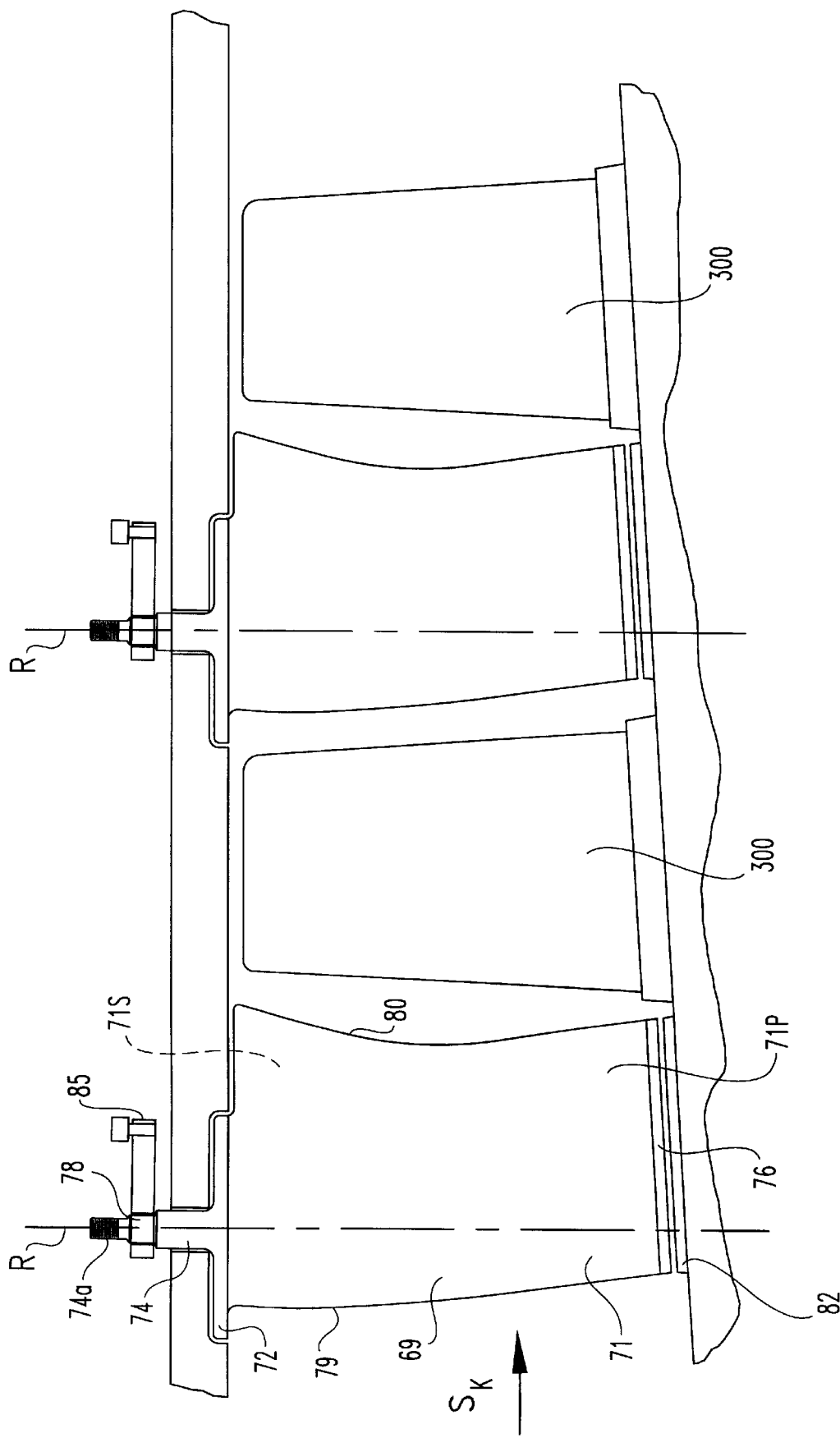
FIG. 11 is an illustrative view of a plurality of cantilevered variable vanes each with a winglet shown in place within an engine.

With reference to FIG. 11, there is illustrated a plurality of cantilevered variable vanes and blades 300 within a converging flow path of a gas turbine engine. It is understood that in a coverging flow path the vanes may be of different size, however for discussion purposes herein only one vane will be described. Variable vane 69 includes an airfoil 71 with outer diameter button 72 and outer diameter spindle 74. Airfoil 71 has a leading edge 79 and a trailing edge 80 and a pressure side 71P and suction side 71S. A winglet 76 is attached to the inner diameter end of airfoil 71 and is substantially adjacent to a shroud 82. Spindle 74 extends radially outward from outer diameter button 72 and is attached to actuator 85 at portion 78. Additionally, threading 74a may be provided at the radially outward-most point of spindle 74 for attachment purposes. The operation of actuator 85 allows the simultaneous rotation of all airfoils 71 along a rotational axis R.

Figure 12:
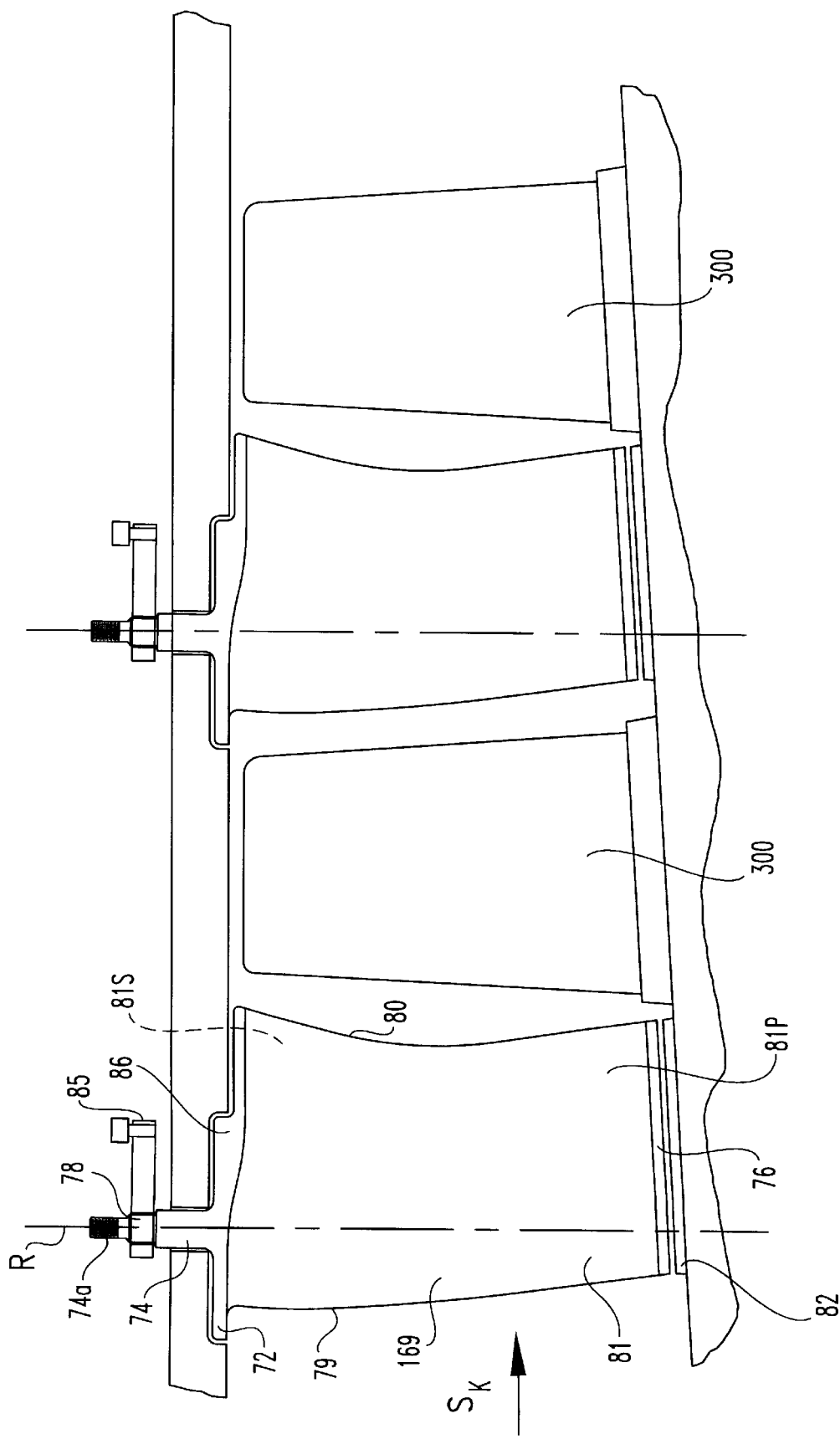
FIG. 12 is an illustrative view of another embodiment of the present invention, a plurality of cantilevered variable vanes each with two winglets.

With reference to FIG. 12, there is a plurality of cantilevered variable vanes 169 and blades 300 within a coverging flow path of a gas turbine engine as in FIG. 11, with a major difference being that each vane 169 has a second winglet 86 at the outer diameter end of airfoil 81. It is contemplated as within the scope of the invention to include fillets at the intersection points of airfoil 81, winglets 76, 86, and outer diameter button 72 as desired. Further, the airfoil has a pressure side 81P and a suction side 81S.

Figure 13:
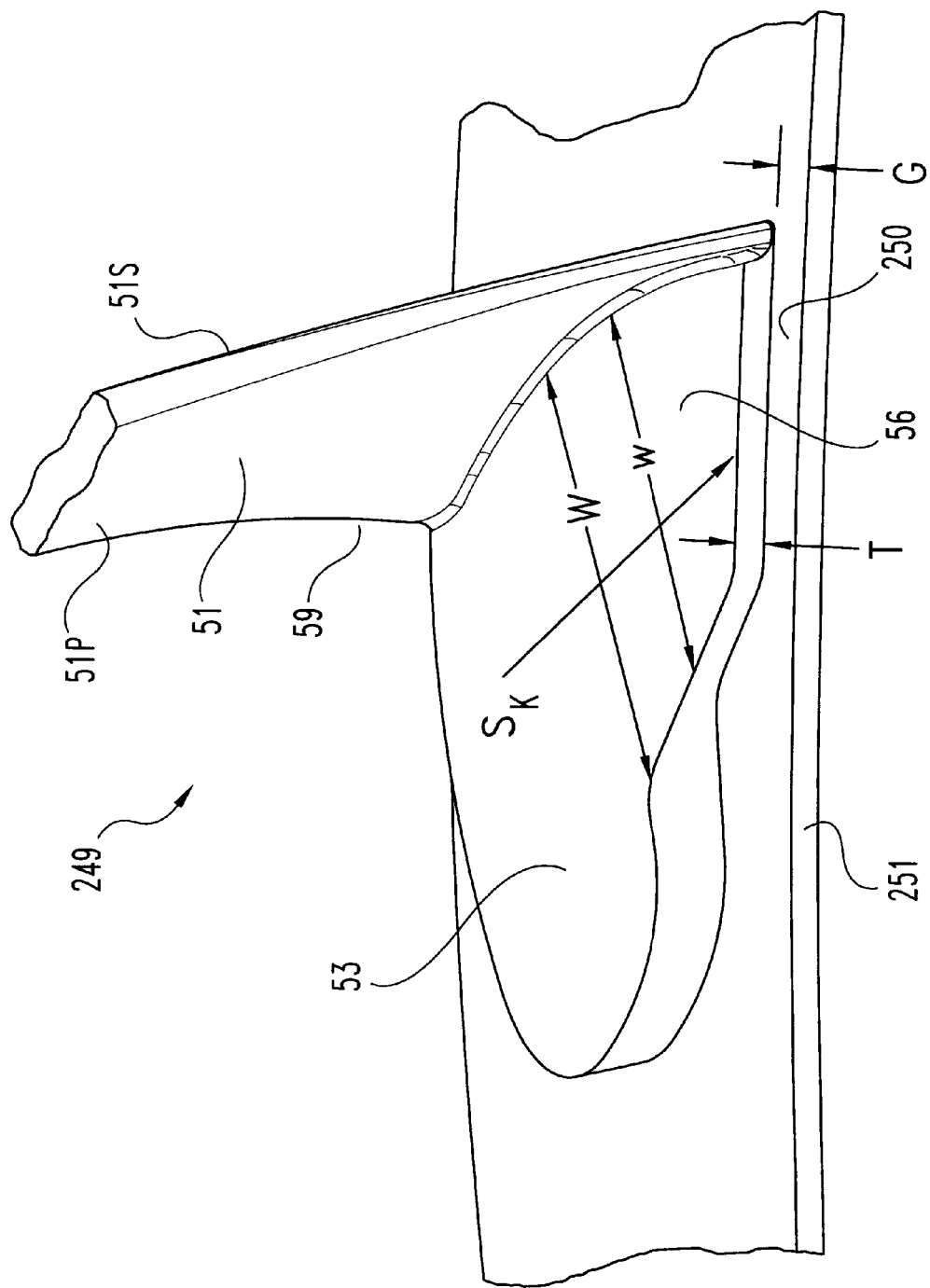
FIG. 13 is a partial view of the variable vane with a winglet.

Referring to FIG. 13, there is a partial view of a vane 249 in which like elements are labeled as in the vane 49 of FIG. 9. It may be seen that the winglet 56 with thickness T described herein substantially increases the width W of the endwall gap 250 shown with thickness G. The width W of endwall gap 250 is shown as decreasing along the arrow $S_K$, indicating a flow path between leading edge 59 and a trailing edge. The increased width W of endwall gap 250 reduces the leakage flow of gas through the endwall gap 250, and more preferably reduces the leakage flow between zero and twenty percent. The leakage flow of gas through the endwall gap 250 is caused by the difference in pressures between the two sides 51S, 51P of the airfoil 51. The winglet 56 reduces the loss associated with the vortex flow caused by the leakage of gas from the pressure side 51P to the suction side 51S of the airfoil 51. This vortex interacts with the airfoil 51 and boundary layers on endwall 251 producing a region of high loss and aerodynamic blockage. The winglets described herein reduce the size of the vortex and force it away from the airfoil surface resulting in less airfoil surface boundary layer interaction and loss.

In one aspect, the gas turbine variable vane with winglet described herein gives improved aerodynamic performance due to the reduced clearance flow vortex losses. In another aspect it is desirable to define the rotational axis so as to minimize the endwall gaps. Often the optimum rotational axis definition does not provide adequate button coverage for structural consideration and must be shifted away from optimum. This results in larger endwall gaps and hence higher losses associated with endwall gap leakage flows. The variable vane with winglet allows for optimum placement of the rotational axis to minimize clearance. Additionally, structural integrity is achieved regardless of button size or location because the winglet increases stiffness and acts as a bracing strut on the airfoil, thereby increasing the resonant frequency of the airfoil.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A gas turbine engine variable vane, comprising:
   an airfoil having an outer surface extending spanwise between an inner and an outer end and further extending streamwise between a leading edge and a trailing edge;
   a first button coupled to one of said ends of said airfoil; and
   a first winglet positioned along one of said ends of said airfoil and extending from said outer surface, wherein said first winglet is configured so as to increase the width of a first endwall gap defined by said one of said ends and a first surface of the gas turbine engine, the width of the first winglet along a first portion substantially adjacent the leading edge being greater than the width of the first winglet along a second portion substantially adjacent the trailing edge.

2. The variable vane of claim 1, wherein said airfoil has a rotational axis extending spanwise between said inner and outer ends, said first button is at said outer end of said airfoil, and a first spindle extending outward in the spanwise direction from said first button and co-linear with said rotational axis.

3. The variable vane of claim 2, further including a second button at said inner end of said airfoil, and a second spindle extending outward in the spanwise direction from said second button and co-linear with said rotational axis, and wherein said winglet is integrally formed with one of said buttons.

4. The variable vane of claim 2, which further includes a second button at said inner end of said airfoil, and a second spindle adjacent said second button and extending inward in the spanwise direction and co-linear with said rotational axis; and,
   wherein said first winglet runs along a chord length between the leading and trailing edges of said airfoil and increases the stiffness of said variable vane, said first winglet being integrally formed with said second button and wherein said first winglet has a thickness between about 0.030 to about 0.060 inches so as to minimize aerodynamic blockage.

5. The variable vane of claim 1, wherein said variable vane is a low aspect ratio variable vane.

6. The variable vane of claim 1, wherein said variable vane is a cantilevered variable vane.

7. The variable vane of claim 1, wherein said winglet runs along a chord length between the leading and trailing edge of said airfoil to increase the stiffness of said variable vane.

8. The variable vane of claim 7, wherein said winglet is between about 0.030 to about 0.060 inches so as to minimize aerodynamic blockage.

9. The variable vane of claim 1, wherein said first winglet is at said inner end, and further including a second winglet running along said outer end and extending from said outer surface, said first button being coupled to said outer end of said airfoil.

10. The variable vane of claim 9, which further includes a first fillet connecting between the intersection of said inner end and said first winglet, and a second fillet incorporated at the intersection of said outer end and said first button.

11. The variable vane of claim 9, which further includes a second button at said inner end of said airfoil, and a second spindle adjacent said second button and extending inward in the spanwise direction and co-linear with said rotational axis; and,
wherein said first and second winglets run along a chord length between the leading and trailing edges of said airfoil, increasing the stiffness of said variable vane, said first and second winglets being integrally formed with said second and first buttons respectively, and said first and second winglets having a thickness between about 0.030 to about 0.060 inches.

12. The variable vane of claim 11, wherein said airfoil has a pressure side and a suction side, and wherein said first and second winglets extend from said suction side and said pressure side.

13. The variable vane of claim 11, wherein said airfoil has a pressure side and a suction side, and wherein said first and second winglets extend from said suction side.

14. The variable vane of claim 11, wherein said airfoil has a pressure side and a suction side, and wherein said first and second winglets extend from said pressure side.

15. The variable vane of claim 1, wherein said airfoil has a pressure side and a suction side, and wherein said winglet is on said suction side.

16. The variable vane of claim 1, wherein said airfoil has a pressure side and a suction side, and wherein said winglet is on said suction side and said pressure side.

17. The variable vane of claim 1, wherein said airfoil has a pressure side and a suction side and wherein said winglet is on said pressure side.

18. A gas turbine engine variable vane, comprising:
an airfoil with an outer surface having a pressure side and a suction side, said airfoil including opposed inner and outer ends and opposed upstream and downstream ends;
a first boss mounted to said inner end; and
a first winglet formed with said first boss on said inner end, wherein said first winglet is configured so as to reduce loss associated with a vortex flow caused by a leakage of a gas from said pressure side to said suction side of said airfoil by forcing the vortex away from said outer surface, said first winglet being configured so as to increase the width of a first endwall gap defined by said inner end of said airfoil and a first surface of the gas turbine engine, the width of the first winglet substantially tapering from the upstream end to the downstream end.

19. The variable vane of claim 18, wherein said first winglet runs along a chord length between the upstream and downstream ends of said inner end, and said first winglet acting as a brace increasing the stiffness of said variable vane.

20. The variable vane of claim 19, wherein said first winglet has a thickness between about 0.030 to about 0.060 inches so as to minimize aerodynamic blockage.

21. The variable vane of claim 19, wherein said first winglet has a thickness between about 0.030 to about 0.060;
further including a first fillet connecting between the intersection of said inner end with said first winglet, a second boss mounted to said outer end of said airfoil, a second fillet connecting between the intersection of said outer end with said second boss, a first spindle adjacent said first boss extending inward from said inner end and centered on the rotational axis of said airfoil, and a second spindle adjacent said second boss extending outward from said outer end and centered on the rotational axis of said airfoil; and
said first winglet being configured so as to increase the width of a first endwall gap defined by said inner end of said airfoil and a surface of the gas turbine engine.

22. The variable vane of claim 21, further including a second winglet formed with said second boss and mounted to the outer end of said airfoil, said second winglet being configured to increase the width of a second endwall gap defined by said outer end of said airfoil and a second surface of the gas turbine engine to which said variable vane is adjustably mounted.

23. The variable vane of claim 18, which further includes a first fillet connecting between the intersection of said inner end with said first boss and said first winglet, and a second fillet connecting between the intersection of said outer end with a second boss mounted to said outer end.

24. The variable vane of claim 18, wherein said airfoil has a rotational axis extending between said opposed inner and outer ends, and which further includes a first spindle extending inward from said inner end and centered on the rotational axis of said airfoil, and further includes a second spindle extending outward from said outer end and centered on the rotational axis of said airfoil.

25. The variable vane of claim 18, further including a second winglet formed with a second boss, said second boss being mounted to said outer end of said airfoil, said second winglet being configured so as to increase the width of a second endwall gap defined by said outer end of said airfoil and a second surface of the gas turbine engine to which said variable vane is adjustably mounted.

26. The variable vane of claim 18, wherein said variable vane is a low aspect ratio variable vane.

27. The combination of claim 12, further including a second boss at said outer end of said airfoil, said first boss being coupled to said inner end of said airfoil and said first winglet being integrally formed with said first boss.

28. A combination, comprising:
a gas turbine engine including a mechanical housing;
a plurality of variable vanes disposed within a fluid flow path within said mechanical housing, each of said plurality of vanes comprising:
an airfoil with a pressure side and a suction side, said airfoil having an outer surface extending spanwise between an inner end and an outer end and further extending streamwise between a leading end and a trailing end, said airfoil having a rotational axis extending spanwise between said inner and outer ends;

a first boss coupled to one of said inner and outer ends of said airfoil; and, a first winglet running along one of said inner and outer ends of said airfoil and extending from said outer surface, wherein said winglet does not extend upstream of said leading end of said airfoil.

29. The combination of claim 28, wherein said first winglet runs along a chord length between the leading and trailing ends of said airfoil, said winglet acting as a brace increasing the stiffness of said variable vane.

30. The combination of claim 28, wherein said winglet has a thickness between 0.030 to 0.060 inches so as to minimize aerodynamic blockage.

31. The combination of claim 28, wherein each of said variable vanes is adjustably connected to said mechanical housing by a spindle extending outward from said outer end of said airfoil, said spindle being co-linear with the rotational axis.

32. The combination of claim 31, wherein said first winglet is at said inner end, and further including a second winglet on said outer end.

33. The combination of claim 28, wherein said first winglet is at said inner end, and further including a first fillet connecting between the intersection of said inner end and said winglet.

34. The combination of claim 28, wherein at least one of said variable vanes is a low aspect ratio variable vane.

35. The combination of claim 28, wherein at least one of said variable vanes is a cantilevered variable vane.

* * * * *